UNITED STATES PATENT OFFICE.

HELEN CECILIA MARGARET FRANKS, OF BROOKLYN, NEW YORK, ASSIGNOR, BY MESNE ASSIGNMENTS, TO FRANKS & CO., INC., A CORPORATION OF DELAWARE.

METHOD OF PRESERVING FRUITS AND OTHER ORGANIC SUBSTANCES.

14,489. Specification of Reissued Letters Patent. Reissued June 25, 1918.

No Drawing. Original No. 1,232,271, dated July 3, 1917, Serial No. 164,120, filed April 24, 1917. Application for reissue filed March 18, 1918. Serial No. 223,243.

*To all whom it may concern:*

Be it known that I, HELEN C. M. FRANKS, a subject of the King of Great Britain, residing temporarily at 1529 Pacific St., Brooklyn, borough of Kings, State of New York, have invented certain new and useful Improvements in Methods of Preserving Fruits, Fruit Products, and Vegetables and other Organic Substances, Fresh and Unchanged, fully described and represented in the following specification.

The object of this invention is to treat fruits, fruit products, vegetables and such perishable articles and other organic substances, with a germ destroying or inhibiting gas, as carbon dioxid ($CO_2$) in such a practical and economical manner, that at a relatively small expense, the articles may be preserved from decay indefinitely, and retain their original appearance and flavor; without which their food value would be materially diminished.

Where it is required to keep the articles fresh for a relatively short time, as a month or two, and at a more or less even temperature and humidity, a charge of $CO_2$ gas is applied once under a considerable pressure to the articles, and the pressure repeated after a gradual exhaustion of the first charge.

No heat is used in my method of preserving, as the very object of my methods is to preserve the natural qualities of the articles unchanged.

When it is required to preserve the fruit for a long time, as on a voyage or a journey in which it will be carried through various latitudes, and thus exposed to differences of temperature and humidity, the first charge of $CO_2$ gas is extracted from the articles by a partial vacuum before the second charge of $CO_2$ is applied; and other charges of $CO_2$ and of nitrogen are applied to the articles at carefully graduated pressures, which charges completely remove any tendency to decay or fermentation under any conditions. During the treatment, the articles are packed in suitable separate permanently charged containers of any suitable size and material.

Each container has an independent open communication with the atmosphere, and any required number of such containers is inclosed in a tight chamber of a suitable size and strength to receive them, and to sustain the pressure at which the gas is applied.

Each container is provided with means to hermetically seal it in a partial vacuum or any desired pressure at the close of the treatment, and means is provided within the chamber to seal all the containers before they are brought into the air.

I am aware that it has been proposed to use $CO_2$ as a preserving agent, but its successful or effective use requires that the pressure of its application should be great, but applied in such a manner as to not crush the fruit; and its withdrawal effected in such a manner as to not expand and rupture the fruit, and the mere suggestion of its use is of no real value.

To be effective, the present invention includes various specified steps, practised in a prescribed manner, which long experiment has shown are essential to the practical and successful preservation of the fruit, fruit products or the vegetables or other organic substances.

The mere immersion of the article in the gas of $CO_2$ is valueless, as the pores in the interstices of the article must be penetrated by the gas, to completely eliminate the oxygen or air and obnoxious germs, and effectively preserve the fruit.

Too low a pressure is therefore inadequate, and too high a pressure is injurious and expensive to generate; wherefore repeated experiments were necessary to determine the lowest efficient pressure, and the safe mode of applying it.

By such means I have determined that a pressure of 60 lbs. per square inch for $CO_2$, applied in a certain manner, is necessary to protect such articles effectively from change, and that such pressure may be safely applied by observing the following rules, which were also ascertained by repeated experiments.

The term "process" is used herein to include all the successive treatments, specified in any claim, by subjecting the article to the pressure of gas or to the exhaustion of the air or oxygen and other gases from its tissues. The term "treatment" will be undestood as applicable to any one step of the process.

To meet commercial requirements, the tightly closed chamber receiving the gas under a pressure of 60 lbs. pressure per square inch, is made of suitable size to admit a large number of containers, as glass jars or tin cans, and to support them in proper connection with sealing mechanism, which can be actuated from the interior of the chamber while a vacuum is maintained therein.

I have described one method of treating the articles, and another method which is a specific form of the first method involving additional treatments, which will preserve the fruit or vegetable articles indefinitely.

The method for a partial preservation of the fruit I call "Method A," and practice it as follows:

The containers permanently charged with the fruit or vegetable to be treated, being thus arranged in the chamber the $CO_2$ gas is introduced and the pressure gradually increased, for a period of ten or twenty minutes, to a pressure of 60 or 70 lbs., per square inch, which is maintained for twenty minutes.

This pressure is very gradually reduced to atmospheric pressure, allowing twenty to thirty minutes for the $CO_2$ gas in the articles to escape.

This step removes from the chamber much of the air or oxygen first contained therein: but a partial vacuum (one half of the atmospheric pressure or 16 inches of mercury) to remove the air or free oxygen more completely, and I therefore generate such vacuum within the chamber very gradually for a space of ten or twenty minutes, thus avoiding any rupture of the skin of for instance delicate fruit, as ripe peaches. I then again supply $CO_2$ to this exhausted chamber, carrying the pressure very gradually for twenty minutes to 60 lbs. per square inch, as before.

I subject the articles to this gas for a period of one hour after it has attained that pressure, and then very, very slowly discharge this gas, with any mingled air or oxygen, and exhaust the chamber to a vacuum of at least sixteen mercury inches.

It is exceedingly needful that this exhaustion of the chamber be effected steadily at a uniform rate, as any pulsations in the atmosphere of the chamber, which a vacuum pump may produce, is very detrimental to the substance from which the gas and air are being extracted during such exhaustion. Sudden pressure may crush the substance, but the danger from pressure is not half so serious as that from sudden or uneven or too quick evacuation. When the final vacuum or pressure has been gradually attained or introduced, the containers are sealed in such vacuum within the chamber in a rarefied atmosphere of $CO_2$ or such desired pressure while protected from any exposure to the outer air; and the two pressures of the $CO_2$ will be found sufficient to preserve such articles for one or two months, as the treatments, by the gas and exhaustions, operate to displace nearly all the air or oxygen or other gases in the tissues of the articles, and replace them with the preservative or inert gases.

The Method A above described for the partial preservation of fruit I have found valuable for application to fruits and like substances packed green or immature and permitted to ripen or mature, as the treatment displaces free oxygen or air sufficient to effect the preservation from rapid processes of fermentation or decay, and yet does not so affect the gaseous content of the fruit or other substances as to inhibit or prevent ripening or maturing thereof.

Further treatments may be applied when the articles are to be kept for a long period or indefinitely, and in such case I call the process "Method B."

In Method B, which is a specific form of the invention, I charge a third time with the $CO_2$ at 60 pounds per sq. inch, and then with nitrogen gas at about 20 lbs. per sq. inch, such method embracing the following steps:

First, the treatment with $CO_2$ gas maintained for not less than 20 minutes; second, the production of a vacuum of about 16″ of mercury;

Third, the treatment with $CO_2$ continued for about an hour;

Fourth, the production of a vacuum of at least 16 inches of mercury;

Fifth, the third treatment with $CO_2$ at 60 lbs. pressure continued for several hours;

Sixth, the production of a partial vacuum to exhaust such gas from the articles; and, Seventh, the treatment of the articles with nitrogen gas at about 20 lbs. for a period of 3 hours, and this gas is then very slowly drawn off the chamber exhausted to 16 inches of mercury, and the containers sealed in the remaining nitrogen or other atmosphere or at any desired pressure. This treatment insures the fruit from alteration or decay under any and all conditions.

This "Method B" subjects the articles to gas pressure four times; three times to $CO_2$ at 60 lbs. pressure, and once to nitrogen gas at about 20 pounds pressure; but substantially the same efficient result can be secured in the third method by using nitrogen gas in both the last two treatments, with a complete evacuation of the chamber intermediate to the two. This method I call "Method C". It will be observed that in the treatments for preserving the article a moderate length of time, the two gas pressures are exerted for periods of 20 minutes and one hour, respectively, but that for preserving the article indefinitely two further treatments are applied and the pressure in each maintained for three hours. Such treatment under pressure for a total of six hours obviously produces a far greater effect upon the article than the two treatments of one hour and twenty minutes applied for the preserving the article for use within a month or so.

The sealing of the containers while inclosed in the chamber is effected by providing the lid or closure of each container with an inlet having means to tightly seal it; and such means may afford an opportunity to strengthen the said seal by solder or otherwise, or after the containers are removed from the chamber.

The above method or treatment is generally applicable to the preservation of all organic substances subject to fermentation or decay by chemical or physiological or biological changes brought about or subject to the presence in the substance of free oxygen or air. In the above description of the treatments, fruit and fruit products and vegetables have been selected only as specific subjects for illustrative description.

In the treatment of other organic substances the method is substantially as above described, the fact being always in mind that the object of the treatment is to displace or remove all contained oxygen or air in the substance to be preserved and for such purpose the treatment with $CO_2$ gas under pressure is that the gas may be forced into the substance to be treated and in the container to displace the free air or oxygen, and that the bringing on of the so called vacuum or low pressure is to extract and remove the contained air or oxygen, whereupon the succeeding introduction of $CO_2$ may further penetrate into the substances treated and replace any air or oxygen held therein.

After such treatment with $CO_2$ that all free air and oxygen has been removed the substance may be sealed or preserved in an atmosphere of $CO_2$ at any desired pressure, or any inert gas or gases, nitrogen or nitrogen and $CO_2$ may be substituted, at any desired pressure.

Having thus set forth the nature of the invention what is claimed herein is:

1. The process of preserving fruits and vegetables and other organic substances in a suitable container by means of introducing therein $CO_2$ at such pressure sufficient to make the substance give up substantially all oxygen or air on or in the particles and molecules of such substance and container, driving off such eliminated oxygen and replacing therefor substantially pure $CO_2$.

2. The process of preserving fruits and other organic substances comprised in successively subjecting the article to $CO_2$ under pressure, alternating with the withdrawal of the pressure to below atmospheric until substantially all free oxygen or air on or in the particles of such organic substance and in a container thereof is displaced by substantially pure $CO_2$.

3. The process of preserving fruits, vegetables and other organic substances consisting in subjecting the substances to successive charges of $CO_2$ gas at pressures of substantially 60 pounds per square inch and intermediate such charges exhausting the pressure to below atmospheric.

4. In the preparation of fruits and vegetables to preserve the same, the process herein described, consisting in twice subjecting the fruits or vegetables to $CO_2$ gas at a pressure between 60 and 70 pounds per square inch for twenty minutes to one hour respectively, and after each application of the $CO_2$ subjecting the fruits or vegetables to a vacuum of 16 inches of mercury and finally sealing them in a vacuum.

5. The process of preserving fruits and vegetables, which consists in inclosing in a tight chamber a container charged permanently with the fruit, the container having an open communication with the atmosphere of the chamber and means adapted for hermetically sealing the same, forcing $CO_2$ into the chamber to a pressure between 60 and 70 pounds per square inch, maintaining such pressure for at least ten minutes, then very slowly discharging the $CO_2$ and the air mixed therewith, to atmospheric pressure, then exhausting the chamber very gradually, then very gradually for about 15 minutes renewing the $CO_2$ to a pressure between 60 and 70 pounds per square inch and maintaining the pressure of such $CO_2$ upon the fruit for at least one hour, then very slowly discharging the gas and mingled air from the chamber, and excluding the air therefrom, and sealing the container within the chamber before removal therefrom.

6. In the treatment of fruits and vegetables in a plurality of containers simultaneously within a single chamber, the containers being permanently charged with the articles to be treated and constructed to be sealed, and having independent open communication with the atmosphere in the chamber, that process which consists in subjecting the entire contents of the chamber to $CO_2$ at a slowly generated pressure between 60 and 70 pounds per square inch, maintaining such pressure not less than ten minutes, slowly discharging such gas and air mingled therewith, very slowly exhausting the chamber to a vacuum of 16 inches of mercury, then supplying $CO_2$ to this exhausted chamber, carrying the pressure very gradually to at least 60 pounds per square inch, maintaining such pressure for at least one hour, slowly discharging the gas in the chamber and again exhausting the chamber to a vacuum of at least 16 inches, and finally closing the containers within the said chamber before removal therefrom, to protect their contents from the atmosphere.

7. The process of preserving fruits and vegetables, which consists in subjecting the fruits and vegetables in a tight chamber, first, to an atmosphere of $CO_2$ under a pressure of about 60 pounds per square inch and afterward discharging such pressure and subjecting the fruit to nitrogen gas at a pressure of not less than 20 pounds.

8. The process of preserving fruits and vegetables, which consists in inclosing the container, permanently charged with the fruit, in a tight chamber, forcing $CO_2$ into the chamber to a pressure of 60 to 70 pounds and maintaining such pressure for three hours, discharging the $CO_2$ and mingled air from the chamber and exhausting the chamber to at least one-half the atmospheric pressure, then forcing nitrogen at not less than 20 pounds pressure per square inch into the chamber and maintaining such pressure of nitrogen gas for three hours, then discharging the nitrogen gas and partially exhausting the chamber, and sealing the receptacle in such partial vacuum before removal from the chamber.

9. The process of preserving fruits and vegetables, which consists in inclosing in a tight chamber a container permanently charged with the fruit, the container having an open communication with the atmosphere of the chamber and means adapted for hermetically sealing the same, forcing $CO_2$ into the chamber to a pressure between 60 and 70 pounds per square inch, maintaining such pressure for ten or twenty minutes, then very slowly discharging $CO_2$ and the air mixed therewith to atmospheric pressure, then exhausting the chamber very gradually, to 16 inches mercury, then very gradually during a period of fifteen minutes renewing the $CO_2$ to a pressure between 60 and 70 pounds per square inch and maintaining the pressure of such $CO_2$ upon the fruit for one hour, then for a period of fifteen minutes slowly discharging the gas and mingled air to atmospheric pressure, the reduction in pressure being steady and uniform to prevent injury to the tissues of the fruit, then renewing the $CO_2$ at a pressure of 60 to 70 pounds per square inch and maintaining such pressure to operate upon the fruit three hours, then discharging the gas and mingled air, and forcing nitrogen gas into the chamber to a pressure of 20 pounds per square inch and maintaining such pressure for three hours, then removing the nitrogen gas and creating a vacuum of sixteen inches of mercury and sealing the container in such vacuum.

In testimony whereof I have hereunto set my hand.

HELEN CECILIA MARGARET FRANKS.